`United States Patent` [19]

Carroll et al.

[11] 4,012,682
[45] Mar. 15, 1977

[54] LOW KVA STATIC AC MOTOR DRIVE

[75] Inventors: Robert J. Carroll, Warren; Walter K. O'Neil, Southfield, both of Mich.

[73] Assignee: Eaton Corporation, Cleveland, Ohio

[22] Filed: Feb. 5, 1975

[21] Appl. No.: 547,150

[52] U.S. Cl. .............................. 321/5; 321/45 C; 321/2
[51] Int. Cl.² ........................................ H02M 7/00
[58] Field of Search ............................ 321/5, 45 C

[56] References Cited
UNITED STATES PATENTS

| | | | |
|---|---|---|---|
| 3,609,511 | 9/1971 | Risberg | 321/45 C X |
| 3,784,890 | 1/1974 | Geirsbach et al. | 321/45 C X |
| 3,826,959 | 7/1974 | Anderson | 321/45 C X |
| 3,872,364 | 3/1975 | Hübner | 321/45 C X |
| 3,872,372 | 3/1975 | Kautz et al. | 321/45 C |
| 3,887,862 | 6/1975 | Hübner | 321/45 C |

*Primary Examiner*—William M. Shoop
*Attorney, Agent, or Firm*—Teagno & Toddy

[57] ABSTRACT

A commutation circuit for an inverter has a capacitor which is charged prior to commutation of the inverter from an auxiliary dc power source instead of by the principal dc power supply for the inverter. Polarity of the voltage on the capacitor is reversed prior to start of commutation by a switch that connects a first inductor across the capacitor to establish a first capacitor current path through the first inductor. No portion of thee first capacitor current by which the capacitor achieves its reverse polarity flows through the inverter. After the polarity of voltage on the capacitor has been reversed the capacitor is connected by switching so as to apply reverse polarity voltage to the dc input busses of the inverter. Commutation current then flows through the inverter, but not through the first inductor. A separate inductor is provided for the commutation current, in series with the capacitor and the inverter. The circuit is particularly advantageous for apparatus in which the principal dc power supply provides an adjustable dc voltage, because the energy available from this circuit for commutation is not significantly diminished by adjustment of the principal dc power supply to low voltage levels because the auxiliary dc power supply becomes effective at the low levels.

26 Claims, 1 Drawing Figure

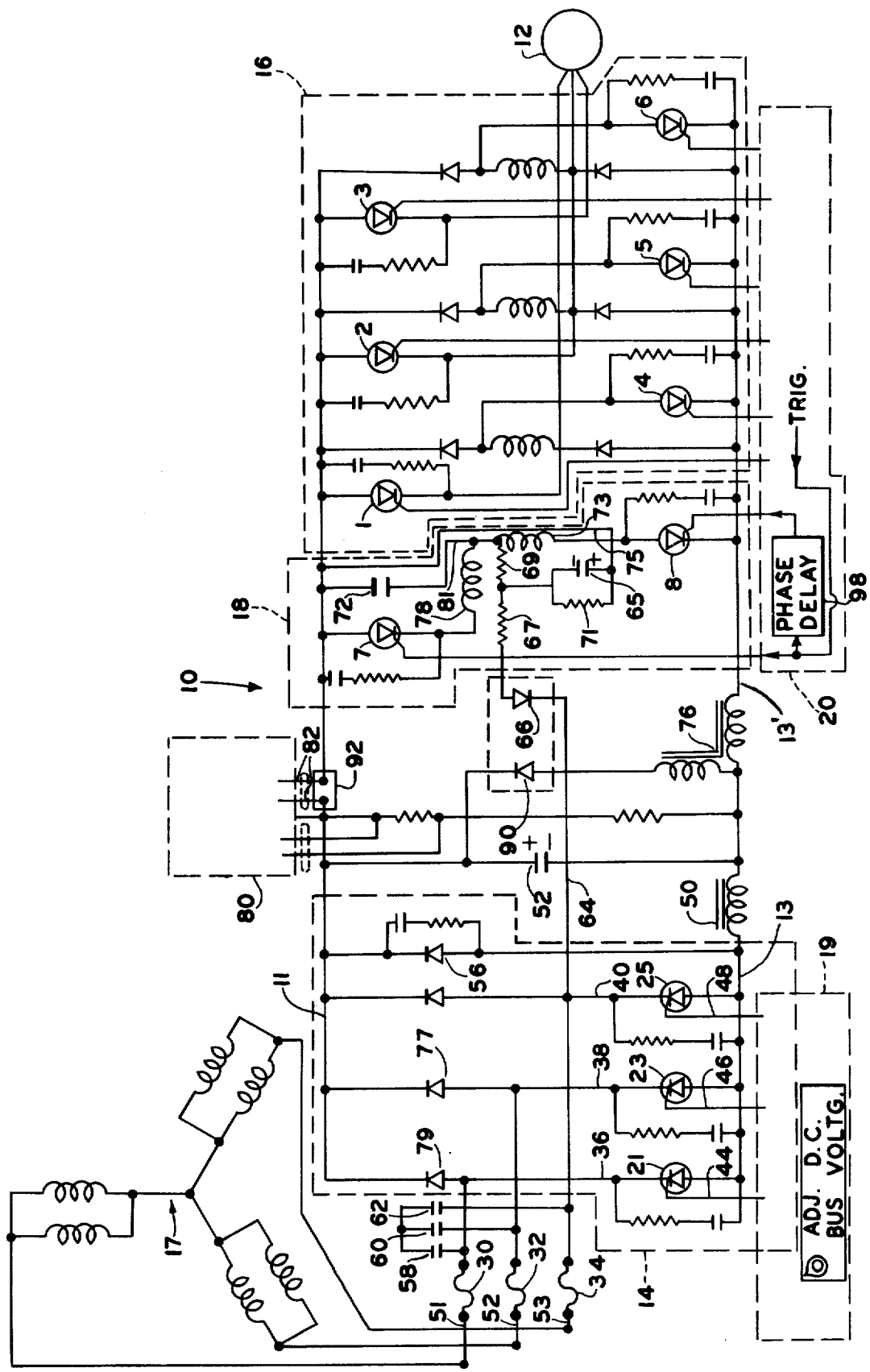

4,012,682

LOW KVA STATIC AC MOTOR DRIVE

BACKGROUND OF THE INVENTION

The present invention relates to inverter circuits and especially to inverter commutation circuits for use with inverters having semiconductors that are periodically triggered into conduction and periodically commutated off by applying voltage of reversed polarity to the dc input busses of the inverter. A problem in circuits of the prior art has been to provide sufficient voltage from the commutation capacitor at the start of commutation to commutate the inverter reliably, and especially when the dc voltage of the input busses of the inverter is adjustable to relatively low voltage values.

Some inverters of the prior art have been commutated off by charging a capacitor to a first polarity of voltage, then connecting the capacitor to dc input busses of the inverter with reverse polarity by means of semiconductor switches. In such inverters the reverse voltage applied to commutate the inverter is, at the start of commutation, the voltage to which the capacitor was initially charged. Other inverters have charged a commutation capacitor to a first voltage, then by means of switching and inductive-capacitive resonance, have discharged and recharged the capacitor to a reverse polarity, and applied the reverse polarity to the dc input busses of the inverter to commutate off the inverter semiconductors. The reverse voltage applied to the dc busses has risen gradually to a maximum reverse voltage because of the nature of the commutation circuits. Other commutation circuits of the prior art involve short-circuiting the dc input busses of the inverter before a reverse polarity of voltage is available for application to the dc bus to commutate off the inverter.

Other commutation circuits of the prior art are unsuitable for commutating inverters whose dc input busses receive variable voltage, which is adjustable down to relatively low voltage values; their commutation characteristics are unreliable at low bus voltages.

Some commutation circuits of the prior art have employed a separate dc source of voltage for charging a commutation capacitor prior to commutation, but either they have not subsequently reversed the polarity of the capacitor through a resonant circuit path other than the inverter itself, or else they have not delayed application of reverse voltage to the dc input busses of the inverter until a maximum reverse voltage has built up on the capacitor. In some prior circuits the separate dc source has provided a large pre-charge on the capacitor even at high output frequencies of the inverter.

SUMMARY OF THE INVENTION

In the present invention a commutation circuit is provided for an inverter that has dc input busses to which a dc voltage is supplied from a principal dc power supply, and has a commutation capacitor charged by an auxiliary dc voltage source that becomes most effective at relatively low voltages of the principal dc power supply. After charging of the capacitor to a first voltage polarity, its polarity is reversed by a resonant circuit. Not until the polarity reversal is substantially complete is an electronic switch rendered conductive to connect the reverse voltage of the capacitor to the dc input busses of the inverter. Thereupon, reverse voltage of a high magnitude is immediately available for commutation purposes, and the inverter is commutated off.

Accordingly, one aspect of the present invention is to provide a commutation circuit for an inverter that has capacitance for commutating off semiconductors of the inverter, auxiliary charging means different from the principal dc power supply for charging the capacitor to voltage of a first polarity and of an amount that is adequate for commutation, a circuit for resonantly reversing the polarity of the capacitor voltage, and switching circuitry that is triggered after complete reversal of capacitor voltage to connect the reverse voltage to the input busses of the inverter for commutation of the inverter.

In another aspect of the invention, separate inductors are provided in a first circuit for reversing the polarity of voltage on the capacitor and in a second circuit for main commutation current through the inverter itself.

A further aspect of the invention involves separate switching circuits for establishing a first current path bypassing the inverter for reversing the polarity on the commutation capacitor, and for establishing a second current path bypassing the first current path, for commutation current through the inverter in a reverse direction. The second current path is established in response to a control signal after the reverse polarity on the commutation capacitor has built up.

In still another aspect of the invention, an inductor is provided in a main commutation reverse current path through the inverter, which is a separate inductor from an inductor employed for reversing the capacitor polarity shortly before commutation.

In another aspect of the invention an auxiliary charging means is most effective when, at low inverter output frequency, the principal dc power supply has insufficient voltage to charge the commutation capacitor adequately.

Other aspects and features of the invention are apparent from the description of the preferred embodiment, the claims, and the figures herein.

BRIEF DESCRIPTION OF THE DRAWING

The sole FIGURE is a schematic drawing of the inverter control system of the present invention.

DESCRIPTION OF THE PREFERRED EMBODIMENT

Referring now to the drawings, it will be understood that a preferred embodiment of the present invention is depicted therein and the showing is not intended to be limiting of the invention in any way. In the preferred embodiment a three-phase power source having phases 51, 52 and 53 is connected to an inverter circuit 10 to control a three-phase motor 12. The inverter circuit 10 converts the three-phase input power on lines 51, 52 and 53 to a variable dc voltage between the positive bus 11 and the negative bus 13 which is converted back to three-phase power by an inverter bridge 16 which drives the motor 12. The inverter circuit 10 is basically comprised of a converter circuit 14 which converts the three-phase ac power to a variable dc power level, and inverter bridge circuit 16 which inverts the variable dc power back to an ac power signal which is suitable to drive the motor 12, and a commutation circuit 18 which is connected across the inverter bridge 16 and provides common quenching to the SCRs 1–6 of the inverter bridge 16. The variability of the dc power signal is controlled by a firing control circuit 19 and the operation of the inverter bridge 16 and the commutating circuit 18 are both controlled by a firing control circuit 20 which fires the SCRs of the various circuits in a predetermined sequence and time arrangement to insure proper operation of the inverter circuit 10. The exact construction of the firing control circuits 19 and 20 is within the skill of one of ordinary skill in the art and hence detailed construction will not be discussed herein.

Turning specifically to the converting circuit 14, it will be noted that the individual power phase lines 51, 52 and 53 receive power from the secondary windings 17 of a transformer. In each of the lines 51, 52 and 53, fuses 30, 32 and 34 are series connected to protect the wiring from a faulty power supply. The fuses 30, 32 and 34 also provide back-up protection should any automatic fuseless electronic protection means fail to clear faults within the inverter 10. Capacitors 58, 60 and 62 are Y-connected to the individual lines 51, 52 and 53 of the ac power supply to protect the SCRs from voltage switching transients on the input supply. The outputs of the fuses are connected by lines 36, 38 and 40 to the cathodes of SCRs 21, 23 and 25, respectively. SCRs 21, 23 and 25 form a half-wave rectifier to establish an adjustable negative voltage dc bus on line 13. The SCRs 21, 23 and 25 establish a half-wave rectified dc voltage which is made adjustable by controlling the firing angle of the SCRs 21, 23 and 25. The firing angle of the SCRs is controlled by the firing control circuit 19 which establishes firing signals at the gates 44, 46 and 48 of the SCRs 21, 23 and 25, respectively.

The rippled dc voltage level established on line 13 by the half-wave bridge is filtered and smoothed by an LC filter formed by an inductor 50 and a capacitor 52 which are connected between the negative bus 13 and the positive bus 11. The capacitor 52 smooths the dc bus in spite of current impulses from the input SCRs 21, 23 and 25 and the motor reverse rectifier bridge. The inductor 50 reduces current impulses to a low rms value. A diode 56 is also connected between lines 11 and 13. The diode 56 functions as a current circulation diode along with the inductor 50 and the motor, thereby insuring that the rectifiers 21, 23 and 25 will be turned off whenever they are ungated by the firing control circuit 19.

From the foregoing, it may be seen that the converter circuit 14 converts the three-phase ac power from lines 51, 52 and 53 into a filtered dc output signal between a positive bus 11 and a negative bus line 13 following an autotransformer/choke 76 and whose output level is varied by the SCRs 21, 23 and 25 which are controlled by the firing circuit 19. As such, the variable dc output signal is applied to the inverter bridge 16 having SCRs 1–6 which are controlled by a firing circuit 20 to invert the dc voltage to an ac power signal suitable for operating the motor 12. The inverter bridge 16 is commutated by the commutating circuit 18 which is connected across the inverter bridge 16.

The commutating circuit 18 includes a commutating capacitor 72 which is connected between the positive bus line 11 and the negative bus 13' in a series circuit with an inductor 73 and SCR 8. The commutating capacitor is normally charged to a positive potential as is indicated in the drawing.

A fixed negative voltage auxiliary bus line 64 is provided to establish a charge having a polarity indicated in the drawing on a filter capacitor 65. The negative auxiliary bus line 64 is connected through a diode 66 to a voltage divider comprised of resistors 67 and 69 and to the auxiliary capacitor 65. A discharge resistor 71 is connected in parallel to the auxiliary capacitor 65. A pair of diodes 77 and 79 cooperate with bus line 11 and line 75 to complete the charge path for capacitor 65. It should be apparent that the charge path for capacitor 65 is from line 64, through diode 66, resistor 67, capacitor 65, line 75, bus 11 and either diode 77 or diode 79 depending on the conductivity of SCRs 21 and 23.

The filter capacitor is connected via resistor 69 and line 81 to the main commutation capacitor 72 to insure that the energy available at capacitor 72 is sufficient to commutate SCRs 1–6 of the inverter bridge 16. It should be appreciated that commutation capacitor 72 is charged to a voltage which is dependent upon the potential difference between the positive bus line 11 and the auxiliary line 64, and to some extent upon the period which is available to charge capacitor 72. If the capacitor 72 were charged by both of the dc busses 11 and 13 and not the auxiliary line 64, a sufficient potential would not be available on commutation capacitor 72 to commutate the SCRs of the inverter bridge 16 at times of low potential difference between the busses 11 and 13'. The auxiliary capacitor 65 supplements the charge available on commutation capacitor 72, especially during low frequency operation.

The commutation energy from the commutation capacitor 72 is applied to the inverter bridge 16 through the sequential and timed actions of the SCR 7 and a SCR 8. Approximately 150–300 microseconds before commutation of the inverter bridge 16 is to be implemented, the SCR 7 is fired by a subcircuit of the firing control circuit 20 to effect a polarity reversal of the commutating capacitor 72. The firing of SCR 7 causes the capacitor 72 to discharge through an inductor 78 which effects charging of the capacitor 72 to a polarity opposite that indicated in FIG. 1. This reversed swing of the voltage on the capacitor 72 back-biases the SCR 7 thereby providing self-commutation to SCR 7. Once the commutation capacitor 72 has completely recharged with reverse polarity, SCR 8 is fired by a subcircuit of firing control circuit 20 to apply the commutating energy from the commutating capacitor 72 to the inverter bridge 16. Firing of SCR 8, which is delayed from the firing of SCR 7 by a phase displacement circuit 98 in the firing circuit 20, causes a positive potential to be applied from capacitor 72 through SCR 8 to the negative dc bus line 13'. This positive potential applied to bus line 13' commutates the SCRs of inverter bridge 16. SCR 8 is self-commutated once the commutating voltage again rises and overswings the bus voltage.

The invention does not require the use of centertapped inductors in the inverter bridge 16.

When the output frequency of the inverter is low, the dc voltage across the busses 11, 13' is also relatively low. When the output frequency of the inverter is high, the dc voltage across the busses 11, 13' is relatively high. The commutation capacitor 72 always charges, prior to commutation, to a voltage at least as high as the dc voltage across the busses 11, 13'. This is because, when commutation occurs by current flow from the capacitor 72 through the inductor 73, the SCR 8, and the inverter, the current flow continues until the capacitor 72 has sufficient voltage to back-bias the SCR 8 and therefore terminate conduction of the SCR 8. Back-biasing of the SCR 8 occurs when the voltage on the capacitor 72 has increased to the voltage across the busses 11, 13'.

It is important to note that the voltage across the busses 11, 13' is somewhat higher immediately following a commutation of the inverter than its steady state value immediately before a commutation of the inverter because the autotransformer/ choke 76 has an induced voltage that transiently increases the voltage across the dc busses 11, 13' upon commutation. The voltage on the capacitor 72 at an instant immediately before the SCR 8 is rendered conductive has very little influence on the voltage level to which the capacitor 72 is charged immediately following commutation, because the choke 73 does not have sufficient influence to recharge the capacitor 72 after commutation to a voltage approaching the voltage of the capacitor 72 immediately prior to commutation. The voltage upon the dc bus immediately following commutation is relied upon at least at high frequencies to charge the capacitor 72 in advance preparation for the next commutation action.

At high output frequencies of the inverter, the voltage across the dc busses 11, 13' is high enough to charge the commutation capacitor 72 sufficiently to insure reliable commutation. At high frequencies there is not sufficient time between successive discharges of the capacitor 72 for the auxiliary charging source to charge the capacitor 72 very highly through the resistors 67, 69. At low output frequencies of the inverter, the voltage on the dc busses 11, 13' alone is not sufficient to charge the commutation capacitor 72 to a high enough voltage for reliable commutation. At low frequencies the auxiliary charging source has sufficient time between successive discharges of the capacitor 72 to charge the capacitor 72 to an adequately high voltage for reliable commutation,. the capacitor 72 being charged by current through the resistors 67 and 69.

To summarize, at high frequencies the auxiliary charging power supply does not provide sufficient voltage to the capacitor 72, but the voltage across the dc busses 11, 13' does provide sufficient voltage; conversely, at low frequencies the dc busses 11, 13' do not provide sufficient voltage to charge the capacitor 72 adequately, but the auxiliary dc power supply does have sufficient time between capacitor discharges to provide an adequately high precharge to the capacitor 72. Collectively, the dc busses 11, 13', and the auxiliary charging power supply insure that the capacitor 72 always has an ample voltage at the start of commutation to commutate off the main power stages of the inverter reliably.

During the time interval in which commutation of the inverter bridge 16 is taking place, inrush current from the capacitor 52 is limited to an acceptable value by the inductor 76. Diode 90 prevents secondary winding of the inductor from conducting. The energy associated with the inrush current from the capacitor 52 is fed back to the supply through the secondary of the inductor 76 and the diode 90 upon the completion of the commutation interval.

The thyristor bridge 16 is of a known design which includes SCRs 1–6, three of which are on during any output pulse produced to the motor 12. The control of the SCRs 1–6 is accomplished by the firing control circuit 20. An example of such an inverter bridge and its control may be found in U.S. Pat. No. 3,538,420 issued to F. N. Klein to which the reader is referred for a more detailed discussion of the bridge and its functioning.

The present inverter system also includes an overload control circuit 80 which is connected across resistor 92 by way of lines 82 to monitor the current level of the SCRs 1–6. The overload control 80 is also connected by means not illustrated to control the SCRs 1–6 of the inverter bridge 16 and to control SCRs 21, 23 and 25. The overload control 80 monitors the current level on the positive bus 11 and upon detecting that the current has exceeded a predetermined maximum condition will switch off the SCRs 21, 23 and 25 will fire all of the SCRs 1–6 of the inverter bridge 16. Such action will prevent any circuit component from being subjected to possibly damaging current levels as well as insuring that no further supply current reaches the inverter circuit 10 by switching off the SCRs 21, 23 and 25 controlling the application of the current to the inverter bridge.

Certain modifications and additions will occur to persons skilled in the art upon the reading of the present disclosure. It will be understood that it is the applicant's intention to include all such modifications and additions since they have been left out for the sake of brevity and readibility.

What is claimed is:

1. A commutation circuit for a voltage controlled inverter that has dc input busses of nominal positive and negative polarity and inverter semiconductors periodically triggered into conduction and periodically commutated off by applying voltage of reverse polarity across the dc input busses to supply ac current to a load comprising:

means connected with said dc input busses for supplying principal dc power of said nominal polarity thereto, capacitance means for storing electrical energy for commutating off said inverter semiconductors, auxiliary charging means connected with said capacitance means for charging said capacitance means to voltage of a first polarity before commutation, said auxiliary charging means comprising at least one of said dc input busses, means connected with said capacitance means and responsive to a first control signal for resonantly reversing the polarity of voltage on said capacitance means, switching means responsive to a second control signal to connect said capacitance means across said dc input busses after reversal of its polarity to apply reverse polarity voltage across said dc input busses for commutation of said inverter semiconductors, and control circuit means for providing said first and second control signals in synchronism with the periodic triggering of said inverter semiconductors including means for providing said second control signal later than said first control signal so as to allow time for resonantly reversing said voltage of said capacitance means before said capacitance means is connected across said dc input busses for commutation.

2. A commutation circuit for an inverter as defined in claim 1 and wherein said means for supplying principal dc power to said dc input busses comprises means for providing variable voltage dc power thereto to affect the amplitude of ac output voltage supplied by said inverter to said load, and wherein said auxiliary charging means comprises means for supplying relatively greater voltage for charging said capacitance means when said principal dc power source provides relatively low voltage than when said principal dc power source provides relatively higher voltage.

3. A commutation circuit for an inverter as defined in claim 2 and wherein said means for supplying principal dc power to said dc input busses comprises converter means receiving substantially constant ac voltage at its input, and wherein said auxiliary charging means comprises rectification means receiving substantially constant ac voltage at its input for producing substantially constant dc voltage for charging said capacitance means through a delaying filter to a voltage dependent upon the time available between commutation to charge said capacitance means.

4. A commutation circuit for an inverter as defined in claim 1 and wherein said capacitance means comprises means having first and second terminals and wherein one of said terminals is connected to assume substantially the potential of one of said dc input busses and the other of said terminals is connected to receive current from said auxiliary charging means, and wherein said auxiliary charging means comprises means for providing a dc voltage whose polarity with respect to said one dc input bus is the same as the polarity of the other dc input bus with respect to said one dc bus.

5. A commutation circuit for an inverter as defined in claim 1 and wherein said means for resonantly reversing the polarity of voltage on said capacitance means includes additional switching means rendered conductive by said first control signal for providing a discharge current path for said capacitance means, and further includes inductance means connected in series with said additional switching means for forcing a continued flow of current after said capacitance means has discharged in order to resonantly reverse the polarity of voltage on said capacitance means.

6. A commutation circuit for an inverter as defined in claim 1 and wherein each of said means responsive to a first control signal and said switching means responsive to a second control signal includes thyristor means.

7. A commutation circuit for an inverter as defined in claim 1 and further comprising inductance means, external to said polarity-reversing means and connected in series with said switching means that is responsive to a second control signal, for conducting commutation current to the input of said inverter.

8. A commutation circuit for an inverter as defined in claim 7 and in which said capacitance means, said switching means responsive to a second control signal, and said inductance means are connected in a series circuit, said series circuit being connected from one to the other of said dc input busses, whereby said inductance means prolongs a flow of capacitive commutation current through said inverter to charge said capacitance means to said first polarity again following commutation of said inverter semiconductors.

9. A commutation circuit for an inverter as defined in claim 1 and wherein said means for resonantly reversing the polarity of voltage on said capacitance means includes triggerable semiconductor means for conducting current from said capacitance means, and inductance means in series with said triggerable semiconductor means for conducting current from said capacitance means; and wherein said capacitance means, triggerable semiconductor means, and inductance means are connected for backbiasing of said triggerable semiconductor means by said capacitance means after said polarity of voltage on said capacitance means is reversed.

10. A commutation circuit for a voltage controlled inverter that has dc input busses of nominal positive and negative polarity and inverter semiconductors periodically triggered into conduction and periodically commutated off by applying voltage of reverse polarity across the dc input busses to supply ac current to a load comprising:

means connected with said dc input busses for supplying principal dc power of said nominal polarity thereto, first capacitance means for storing electrical energy for commutating off said inverter semiconductors, second capacitance means for storing reactive electrical energy returned from said load, auxiliary charging means connected with said capacitance means for charging said first capacitance means to a voltage of a first polarity before commutation, said auxiliary charging means comprising at least one of said dc input busses, means connected with said first capacitance means for resonantly reversing the polarity of voltage on said first capacitance means, including first switching means rendered conductive in response to a first control signal for providing a path for current from said first capacitance means, and further including first inductance means connected in series with said first switching means and with said first capacitance means for prolonging the flow of current in said first capacitance means for resonantly reversing the voltage polarity thereof, second switching means responsive to a second control signal to connect said first capacitance means in a conduction path to apply its reverse polarity voltage across said dc input busses for commutation of said inverter semiconductors, said second switching means being arranged to connect said first capacitance means across said dc input busses in such a way that said conduction path to said inverter is external to said first inductance means, and control circuit means for providing said first and second control signals in synchronism with the periodic triggering of said inverter semiconductors.

11. A commutation circuit for an inverter as defined in claim 10 and wherein said means for supplying principal dc power to said dc input busses comprises means for providing variable voltage dc power thereto to affect the amplitude of ac output voltage supplied by said inverter to said load, and wherein said auxiliary charging means comprises means for supplying relatively greater voltage for charging said first capacitance means when said principal dc power source provides relatively low voltage than when said dc power source provides relatively higher voltage.

12. A commutation circuit for an inverter as defined in claim 11 and wherein said means for supplying principal dc power to said dc input busses comprises converter means receiving substantially constant ac voltage at its input, and wherein said auxiliary charging means comprises rectification means receiving substantially constant ac voltage at its input for producing substantially constant dc voltage for charging said first capacitance means through a delaying filter to a voltage dependent upon the time available between commutations to charge said first capacitance means.

13. A commutation circuit for an inverter as defined in claim 10 and wherein said first capacitance means comprises means having first and second terminals and wherein one of said terminals is connected to assume substantially the potential of one of said dc input busses and the other of said terminals is connected to receive current from said auxiliary charging means, and wherein said auxiliary charging means comprises means for providing a dc voltage whose polarity with respect to said one dc input bus is the same as the polarity of the other dc input bus with respect to said one dc bus.

14. A commutation circuit for an inverter as defined in claim 10 and wherein each of said first and second switching means includes thyristor means.

15. A commutation circuit for an inverter as defined in claim 1 and further comprising second inductance means external to said polarity-reversing means and connected in series with said switching means that is responsive to a second control signal, for conducting commutation current to the input of said inverter.

16. A commutation circuit for an inverter as defined in claim 15 and in which said first capacitance means, said switching means responsive to a second control signal, and said second inductance means are connected in a series circuit, said series circuit being connected from one to the other of said dc input busses, whereby said second inductance means prolongs a flow of capacitive commutation current through said inverter to charge said first capacitance means to said first polarity again following commutation of said inverter semiconductors.

17. A commutation circuit for an inverter as defined in claim 10 and wherein said first switching means includes triggerable semiconductor means and wherein said first capacitance means, said triggerable semiconductor means, and said first inductance means are connected for back-biasing of said triggerable semiconductor means by said first capacitance means after said polarity of voltage on said first capacitance means is reversed.

18. A commutation circuit for a voltage controlled inverter that has dc input busses of nominal positive and negative polarity and inverter semiconductors periodically triggered into conduction and periodically commutated off by applying voltage of reverse polarity across the dc input busses to supply ac current to a load comprising:
 means connected with said dc input busses for supplying principal dc power of said nominal polarity thereto,
 capacitance means for storing electrical energy for commutating off said inverter semiconductors,
 auxiliary charging means connected with said capacitance means for charging said capacitance means to a voltage of a first polarity before commutation, said auxiliary charging means comprising at least one of said dc input busses,
 means connected with said capacitance means for resonantly reversing the polarity of voltage on said capacitance means including first switching means rendered conductive in response to a first control signal for establishing a polarity reversing current path,
 second switching means responsive to a second control signal to connect said capacitance means to apply its reverse polarity voltage across said dc input busses for commutation of said inverter semiconductors, and
 control circuit means for providing said first and second control signals in synchronism with the periodic triggering of said inverter semiconductors, and wherein said current path established by said first switching means is external to said inverter so that the current in said path by-passes said inverter.

19. A commutation circuit for an inverter as defined in claim 18 and wherein said means for supplying principal dc power to said dc input busses comprises means for providing variable voltage dc power thereto to affect the amplitude of ac output voltage supplied by said inverter to said load.

20. A commutation circuit for an inverter as defined in claim 18 and wherein said capacitance means comprises means having first and second terminals and wherein one of said terminals is connected to assume substantially the potential of one of said dc input busses and the other of said terminals is connected to receive current from said auxiliary charging means, and wherein said auxiliary charging means comprises means for providing a dc voltage whose polarity with respect to said one dc input bus is the same as the polarity of the other dc input bus with respect to said one dc bus.

21. A commutation circuit for an inverter as defined in claim 18 and wherein each of said first and second switching means includes thyristor means.

22. A commutation circuit for an inverter as defined in claim 18 and further comprising second inductance means external to said polarity-reversing means and connected in series with said second switching means for conducting commutation current to the input of said inverter.

23. A commutation circuit for an inverter as defined in claim 22 and in which said capacitance means, said second switching means and said second inductance means are connected in a series circuit, said series circuit being connected from one to the other of said dc input busses, whereby said second inductance means prolongs a flow of capacitive commutation current through said inverter to charge said capacitance means to said first polarity again following commutation of said inverter semiconductors.

24. A commutation circuit for an inverter as defined in claim 18 and wherein said means for resonantly reversing the polarity of voltage on said capacitance includes triggerable semiconductor means for conducting current from said capacitance means, and further includes inductance means in series with said triggerable semiconductor means for conducting current from said capacitance means; and wherein said capacitance means, triggerable semiconductor means, and inductance means are connected for backbiasing of said triggerable semiconductor means by said capacitance means after said polarity of voltage on said capacitance means is reversed.

25. A commutation circuit for a voltage controlled inverter that has dc input busses of nominal positive and negative polarity and inverter semiconductors periodically triggered into conduction and periodically commutated off by applying voltage of reverse polarity across the dc input busses to supply ac current to a load comprising:
 means connected with said dc input busses for supplying principal dc power of said nominal polarity thereto, first capacitance means for storing electrical energy for commutating off said inverter semiconductors, second capacitance means for storing reactive electrical energy returned from said load, auxiliary charging means connected with said first capacitance means for charging said first capacitance means to a voltage of a first polarity before commutation, said auxiliary charging means comprising at least one of said dc input busses and means for charging said first capacitance means to different magnitudes of said voltage of a first polarity in dependence magnitudes of said voltage of a first polarity in dependence upon the amount of time available for such charging between successive commutation events, to provide a greater magnitude of said voltage of a first polarity for relatively longer time intervals than for relatively shorter time intervals, means connected with said first capacitance means for resonantly reversing the polarity of voltage on said first capacitance means, including first switching means rendered conductive in response to a first control signal for providing a path for current from said first capacitance means and further including first inductance means connected in series with said first switching means and with said first capacitance means for prolonging the flow of current in said first capacitance means for resonantly reversing the voltage polarity thereof, second switching means responsive to a second control signal to connect said first capacitance means in a conduction path to apply its reverse polarity voltage across said dc input busses for commutation of said inverter semiconductors, said second switching means being arranged to connect said first capacitance means across said dc busses in such a way that said conduction path to said inverter is external to said first inductance means, and control circuit means for providing said first and second control signals in synchronism with the periodic triggering of said inverter semiconductors.

26. A commutation circuit for an inverter that has dc input busses of nominal positive and negative polarity and inverter semiconductors periodically triggered into conduction and periodically commutated off by applying voltage of reverse polarity across the dc input busses to supply ac current to a load comprising:

means connected with said dc input busses for supplying principal dc power of said nominal polarity thereto, capacitance means for storing electrical energy for commutating off said inverter semiconductors, auxiliary charging means connected with said capacitance means for charging said capacitance means to a voltage of a first polarity before commutation, said auxiliary charging means comprising means for charging said capacitance means to different magnitudes of said voltage of a first polarity in dependence upon the amount of time available for such charging between successive commutation events, to provide a greater magnitude of said voltage of a first polarity for relatively longer time intervals than for relatively shorter time intervals, and further comprising capacitive filter means for storing energy to reduce the ripple of voltage provided by said auxiliary charging means to said capacitance means, means connected with said capacitance means for resonantly reversing the polarity of voltage on said capacitance means, including first switching means rendered conductive in response to a first control signal for providing a path for current from said capacitance means and further including first inductance means connected in series with said first switching means and with said capacitance means for prolonging the flow of current in said capacitance means for resonantly reversing the voltage polarity thereof, second switching means responsive to a second control signal to connect said capacitance means in a conduction path to apply its reverse polarity voltage across said dc input busses for commutation of said inverter semiconductors, said second switching means being arranged to connect said capacitance means across said dc input busses in such a way that said conduction path to said inverter is external to said first inductance means, and control circuit means for providing said first and second control signals in synchronism with the periodic triggering of said inverter semiconductors.

* * * * *